United States Patent
Baldwin et al.

(10) Patent No.: US 11,151,312 B2
(45) Date of Patent: Oct. 19, 2021

(54) CONSOLIDATION OF WEB CONTENTS BETWEEN WEB CONTENT MANAGEMENT SYSTEMS AND DIGITAL ASSET MANAGEMENT SYSTEMS

(71) Applicant: International Business Machines Corporation, Armonk, NY (US)

(72) Inventors: Nicholas A. Baldwin, Gladesville (AU); Mark C. Hampton, Fitzroy North (AU); Stefan A. Hepper, Morgan Hill, CA (US); Eric Martinez de Morentin, Manly (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 476 days.

(21) Appl. No.: 14/631,890

(22) Filed: Feb. 26, 2015

(65) Prior Publication Data

US 2015/0339401 A1    Nov. 26, 2015

Related U.S. Application Data

(63) Continuation of application No. 14/284,751, filed on May 22, 2014.

(51) Int. Cl.
*G06F 16/30* (2019.01)
*G06F 16/24* (2019.01)
(Continued)

(52) U.S. Cl.
CPC ........ *G06F 40/186* (2020.01); *G06F 16/2455* (2019.01); *G06F 16/40* (2019.01); *G06F 16/972* (2019.01); *H04L 67/02* (2013.01)

(58) Field of Classification Search
CPC .............. G06F 17/24; G06F 17/30017; G06F 17/30477; G06F 17/30893; H04L 67/02
See application file for complete search history.

(56) References Cited

U.S. PATENT DOCUMENTS 6,947,959 B1 * 9/2005 Gill .................. G06F 17/30011
707/999.003
7,007,034 B1 * 2/2006 Hartman, Jr. ..... G06F 17/30038
707/812

(Continued)

FOREIGN PATENT DOCUMENTS

AU        2004229005      *  9/2004
WO        2013070333 A1     5/2013

OTHER PUBLICATIONS

IBM: List of IBM Patents or Patent Applications Treated as Related (Appendix P).

(Continued)

*Primary Examiner* — Cesar B Paula
*Assistant Examiner* — Carl E Barnes, Jr.
(74) *Attorney, Agent, or Firm* — Anthony R. Curro

(57) ABSTRACT

A method for consolidating reusable image components with multi-media contents is provided. The method includes defining a location in a content template for storing a library of reusable image components and multi-media contents. The method further includes transmitting at least one multi-media content of a digital asset management environment, wherein the transmitted at least one multi-media content is stored in the defined location of the content template with the library of reusable image components. The method further includes determining if the selected at least one multi-media content was transmitted, stored and, is present in the defined location of the content template. The method further includes generating in the defined location of authoring content template, another library of reusable image (Continued)

components of the at the least one multi-media content, if the at least one multi-media content is not confirmed present in the defined location of the content template.

11 Claims, 5 Drawing Sheets

(51) Int. Cl.
| | | |
|---|---|---|
| *H04L 29/08* | (2006.01) | |
| *G06F 40/186* | (2020.01) | |
| *G06F 16/40* | (2019.01) | |
| *G06F 16/958* | (2019.01) | |
| *G06F 16/2455* | (2019.01) | |

(56) References Cited

U.S. PATENT DOCUMENTS

| | | |
|---|---|---|
| 7,149,734 B2 | 12/2006 | Carlson et al. |
| 7,165,041 B1 | 1/2007 | Guheen et al. |
| 7,322,024 B2 | 1/2008 | Carlson et al. |
| 7,383,320 B1 | 6/2008 | Silberstein et al. |
| 8,595,103 B1 | 11/2013 | Wargin et al. |
| 8,602,793 B1 | 12/2013 | Sniedzins |
| 8,719,119 B1 | 5/2014 | Wargin et al. |
| 9,189,514 B1 | 11/2015 | Myslinski |
| 2002/0073149 A1 | 6/2002 | Young |
| 2002/0083097 A1 | 6/2002 | Warrington |
| 2003/0182470 A1 | 9/2003 | Carlson et al. |
| 2003/0233631 A1 | 12/2003 | Curry et al. |
| 2005/0038813 A1* | 2/2005 | Apparao ............ G06F 17/30038 |
| 2006/0265688 A1 | 11/2006 | Carlson et al. |
| 2007/0026375 A1 | 2/2007 | Dewey |
| 2007/0050467 A1* | 3/2007 | Borrett ............ G06F 17/30011 |
| | | 709/213 |
| 2007/0073776 A1 | 3/2007 | Kalalian et al. |
| 2007/0174308 A1 | 7/2007 | Rausch |
| 2007/0260620 A1* | 11/2007 | Smolen ............ G06F 17/30348 |
| 2008/0028300 A1 | 1/2008 | Krieger et al. |
| 2008/0133558 A1 | 6/2008 | Carlson et al. |
| 2008/0263467 A1* | 10/2008 | Wilkins ................ G06F 9/4443 |
| | | 715/765 |
| 2009/0157711 A1 | 6/2009 | Baer et al. |
| 2009/0192845 A1 | 7/2009 | Gudipaty et al. |
| 2010/0057673 A1 | 3/2010 | Savov |
| 2010/0095197 A1* | 4/2010 | Klevenz ............ G06F 17/2247 |
| | | 715/234 |
| 2011/0078157 A1 | 3/2011 | Sun et al. |
| 2011/0288966 A1 | 11/2011 | Hawkins et al. |
| 2012/0022975 A1 | 1/2012 | L'Heureux et al. |
| 2012/0079450 A1 | 3/2012 | Reech et al. |
| 2012/0124517 A1 | 5/2012 | Landry et al. |
| 2012/0136936 A1* | 5/2012 | Quintuna .............. G06F 21/604 |
| | | 709/204 |
| 2013/0268585 A1 | 10/2013 | Shepstone |
| 2014/0032577 A1 | 1/2014 | Trieloff et al. |
| 2014/0082032 A1* | 3/2014 | Leblond ............ G06F 17/30017 |
| | | 707/825 |
| 2014/0195892 A1 | 7/2014 | Hampton et al. |
| 2014/0337266 A1 | 11/2014 | Kalns et al. |
| 2015/0074510 A1* | 3/2015 | Price ..................... G06F 17/227 |
| | | 715/234 |
| 2015/0100406 A1 | 4/2015 | Klimetschek et al. |
| 2015/0339326 A1 | 11/2015 | Baldwin et al. |
| 2015/0339401 A1 | 11/2015 | Baldwin et al. |

OTHER PUBLICATIONS

Pending U.S. Appl. No. 14/284,751, entitled: "Consolidation of Web Contents Between Web Content Management Systems and Digital Asset Management Systems", filed May 22, 2014.

NYU, "Add Content to the DAM", http://www.nyu.edu/employees/resources-and-services/media-and-communications/digital-communications/cms-training-support/authoring/adding-content-to-the-dam.html, Accessed on May 22, 2014, pp. 1-2.

EASYSITE,"All of your media, managed securely . . . ", Digital Asset Management/ Easysite Web CMS, http://www.easysitecms.net/web-content-management/digital-asset-management/, Accessed on May 22, 2014, pp. 1-2.

Closser, "Digital Asset Management in Adobe Experience Manager", Pearson Publishers of technology books, eBooks, and videos for creative people, http://www.peachpit.com/articles/article.aspx?p=2156962, pp. 1-11, Accessed on May 22, 2014.

Macdonald, "Creating Adobe Experience Manager Sling Servlets that invoke MBean operations", Scott's Digital Community, http://scottsdigitalcommunity.blogspot.in/, pp. 1-7, Accessed on May 22, 2014.

Macdonald, "Automating the process of uploading multiple digital assets to the Adobe Experience Manager DAM", Scott's Digital Community, blogspot, Oct. 5, 2013, 6 pages, http://scottsdigitalcommunity.blogspot.in/2013/10/automating-process-of-uploading-digital.html.

* cited by examiner

CONSOLIDATION OF WEB CONTENTS BETWEEN WEB CONTENT MANAGEMENT SYSTEMS AND DIGITAL ASSET MANAGEMENT SYSTEMS

BACKGROUND

The present invention relates to content management systems and, more particularly to, dynamic consolidation of web contents between web management systems and digital asset management systems.

The Information Age, also known as the Digital Age or Computer Age is characterized by the ability to generate, process, transfer, and share information in a negligible amount of time, within the World Wide Web ("WWW"), or the Internet. The WWW has quickly become the vehicle for delivery of information, inside and outside of organizations, or even for personal usage. Within organizations, Intranet delivers information to workers in an easily accessible manner. Outside organizations, the Internet delivers information to the public at large. For instance, information is generally delivered in units, referred to herein, as content, or web content. Web content is textual or visual application code that can be encountered as part of user experience of the WWW. Further, web content management (WCM) is stand-alone application that used to create, manage, store, or deploy web contents, for display to the user, in Web pages of the WWW.

SUMMARY

In one embodiment of the present invention, a computer-implemented method for consolidating reusable image components with multi-media contents, between a digital asset management environment and a web content management environment is provided. The computer-implemented method includes defining, by one or more processors, a location in a content template of a web content management environment for storing a library of reusable image components and multi-media contents of a digital asset management environment, where the defined location is configured to consolidate the library of reusable image components with the multi-media contents. The computer-implemented method further includes transmitting, by the one or more processors, at least one multi-media content of the digital asset management environment, where the transmitted at least one multi-media content is stored in the defined location of the content template with the library of reusable image components. The computer-implemented method further includes determining, by the one or more processors, if the selected at least one multi-media content was transmitted, stored and, is present in the defined location of the content template, where the determination is based on search of component identifiers of the library of reusable image components. The computer-implemented method further includes generating, by the one or more processors, in the defined location of authoring content template, another library of reusable image components of the at the least one multi-media content, if the at least one multi-media content is not confirmed present in the defined location of the content template.

In another embodiment, a computer system for consolidating reusable image components with multi-media contents, between a digital asset management environment and a web content management environment, is provided. The computer system includes one or more processors, one or more computer-readable memories, one or more computer-readable tangible storage devices and program instructions which are stored on at least one of the one or more storage devices for execution by at least one of the one or more processors via at least one of the one or more memories. The computer system further includes program instructions to define a location in a content template of a web content management environment for storing a library of reusable image components and multi-media contents of a digital asset management environment, where the defined location is configured to consolidate the library of reusable image components with the multi-media contents. The computer system further includes program instructions to transmit at least one multi-media content of the digital asset management environment, where the transmitted at least one multi-media content is stored in the defined location of the content template with the library of reusable image components. The computer system further includes program instructions to if the selected at least one multi-media content was transmitted, stored and, is present in the defined location of the content template, where the determination is based on search of component identifiers of the library of reusable image components. The computer system further includes program instructions to generate in the defined location of authoring content template, another library of reusable image components of the at the least one multi-media content, if the at least one multi-media content is not confirmed present in the defined location of the content template.

In yet another embodiment, a computer program product for consolidating reusable image components with multi-media contents, between a digital asset management environment and a web content management environment is provided. The computer program product includes one or more computer-readable tangible storage devices and program instructions stored on at least one of the one or more storage devices. The computer program product further includes program instructions to define a location in a content template of a web content management environment for storing a library of reusable image components and multi-media contents of a digital asset management environment, where the defined location is configured to consolidate the library of reusable image components with the multi-media contents. The computer system includes program instructions to transmit at least one multi-media content of the digital asset management environment, where the transmitted at least one multi-media content is stored in the defined location of the content template with the library of reusable image components. The computer system further includes program instructions to if the selected at least one multi-media content was transmitted, stored and, is present in the defined location of the content template, where the determination is based on search of component identifiers of the library of reusable image components. The computer system further includes program instructions to generate in the defined location of authoring content template, another library of reusable image components of the at the least one multi-media content, if the at least one multi-media content is not confirmed present in the defined location of the content template.

BRIEF DESCRIPTION OF THE SEVERAL VIEWS OF THE DRAWINGS

Novel characteristics of the invention are set forth in the appended claims. The invention will best be understood by reference to the following detailed description of the invention when read in conjunction with the accompanying figures, wherein like reference numerals indicate like components, and:

DETAILED DESCRIPTION

Figure 1:
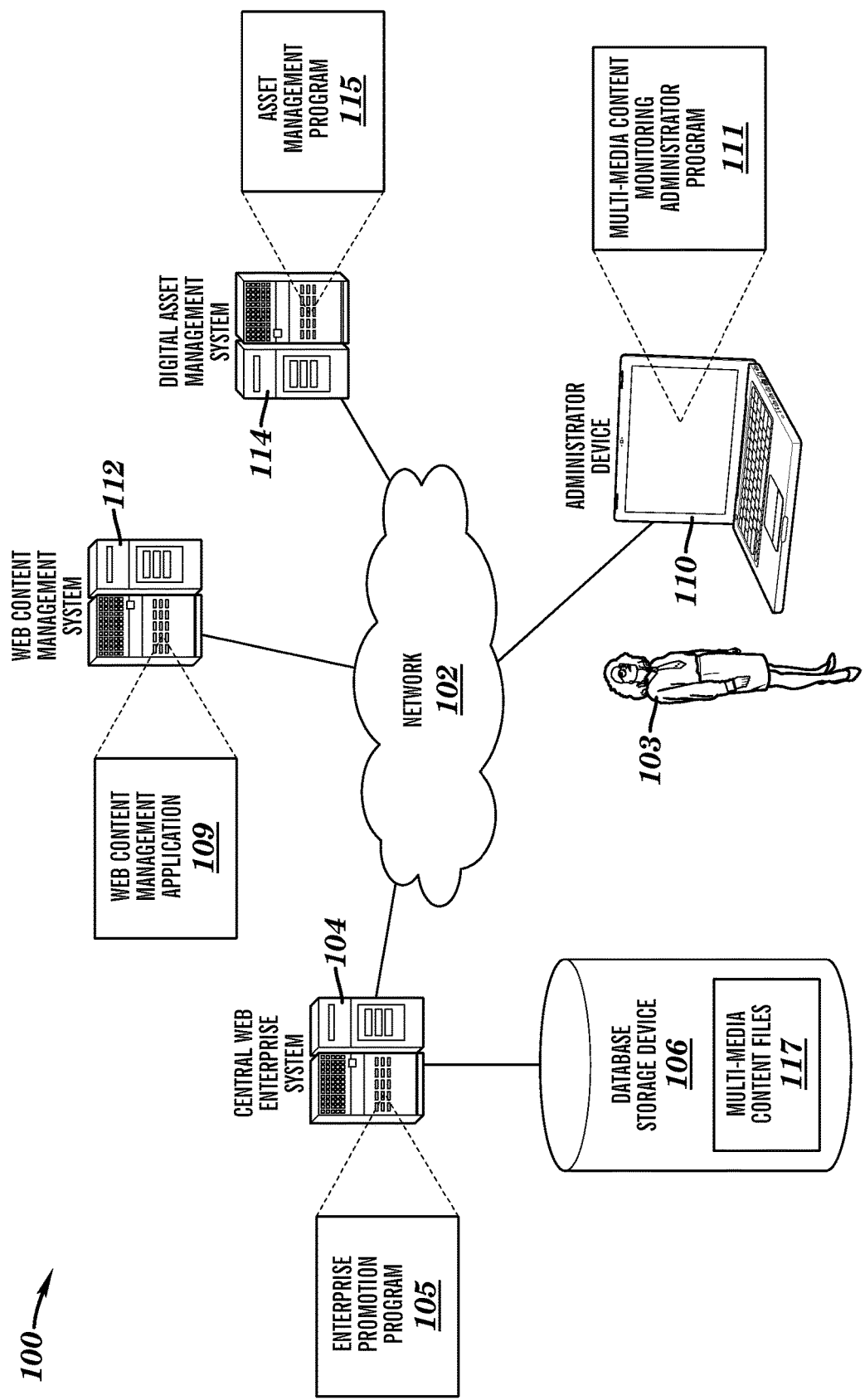
FIG. 1 is a web content management environment for mapping multi-media contents of a digital asset management system with generated library of image components of a web content management system, in accordance with embodiments of the present invention.

A web content management system (WCMS) provides a system interface for publishing, editing, and modifying web contents of the WCMS. The WCMS is also adapted to provide procedures for managing workflow of the web contents, in a collaborative system workflow environment. The web contents can be multi-media contents, such as, text-based data content, voice-based data content, or video-based data of the web contents. The text-based data content, the voice-based data content, or the video-based data content, can be graphics sources, media sources, image sources, and video or audio sources that are published, edited, or modified in the system interface, or web content interface of the WCMS. Multi-media contents are, also, typically upload, or added to the interface of the WCMS. For instance, an administrator of the system environment can upload the multi-media contents directly into the system interface of the WCMS. The multi-media contents can also be directly uploaded to the WCMS, from a digital asset management system (DAMS), into the system interface of the WCMS. The DAMS can also, provide an interface for consolidating managing, or organizing the multi-media contents, or images, for transmittal, and uploading to the multi-media contents to web content interface of the WCMS.

Embodiments of the present invention include one or more circuits, or subassemblies of circuits, as well as, a system, or computer-implemented methods of operations, for defining, in a template of the WCMS, a location for storing, and retrieving multi-media contents, or images of the DAMS. The system further creates, via an administrative interface, a library of reusable image components, in the defined template location, for consolidating, or mapping, in one instance, the created reusable image components with the multi-media contents, or images, transmitted between the DAMS and the WCMS. For instance, the library of reusable image components is a collection of web contents, or meta data, including, image contents, or HTML elements, such as, images, web image identifiers, tables, or plain text, or rich text elements of the web contents, that are created for a web content collection of the WCMS. The library of reusable image components is thus created, for automatic consolidation, or mapping of the reusable image components to the multi-media contents, or web contents of the web content management system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention will now be described in details with reference to the accompanying Figures. Referring now to FIG. 1, web content management environment 100 for mapping multi-media contents of a digital asset management system with generated library of image components of a web content management system, wherein the library of image components are generated in an instance for subsequent consolidation, and mapping of the library of image components with one or more multi-media contents, as described below, is illustrated. Web content management environment 100 includes administrator device 110, web content management system 112, digital asset management system 114, and central web enterprise system 105, which includes database storage device 106, all interconnected over network 102.

Administrator device 110 can be, for example, a laptop, tablets, notebook personal computers (PC), desktop computers, mainframe, mini computer, or personal digital assistant (PDA). Administrator device 110 can also be any portable device that provides computing and, information storage, and retrieval capabilities, including, for example, a handheld device or handheld computer, pocket PC, connected organizer, electronic book (eBook) reader, a personal digital assistant (PDA), or a smart phone, or other mobile portable devices.

Administrator device 110 includes multi-media content monitoring administrator program 111. Multi-media content monitoring administrator program 111 can be any type of web content system application that provides an administrative interface, for defining, a location, for managing, storing, and retrieving, multi-media contents, or images, in an authoring template of web content management system 112. For instance, the administrative interface also allows administrator 103 to create, and store a library of reusable image components, in the defined location, for mapping, in one instance, the created reusable image components with multi-media contents, or images. Multi-media content monitoring administrator program 111 monitors, and detects, the administrative interface, periodically, randomly, and/or using event-based monitoring, to detect administrative, or system definition of the location to store, and retrieve the multi-media contents for transmission of the multi-media contents to web content management system 112.

Central web enterprise system 104 can be, a central mainframe server system, such as, a web management server, a web system administrative server, or any other electronic device, or server computing system that is capable of receiving, and sending data and, also, serving as an intersection for promoting, transmitting, or deploying, selected multi-media contents from digital asset management system 114, via multi-media content monitoring administrator program 111, for storage of the transmitted multi-media contents in defined template locations of web content management system 112, in accordance with embodiments of the present invention.

Central web enterprise system 104 can also represent a "cloud" of computers interconnected by one or more networks, wherein central web enterprise system 104 is a primary server for utilizing clustered computers when accessed through network 102. For instance, a cloud computing system can be a common implementation of a central integrated system that provides a facility to perform automated promotion, and transmission of multi-media contents, between web content management system 112, and digital asset management system 114, for storage of the multi-media contents in defined template locations of web content management system 112. Central web enterprise system 104 includes enterprise promotion program 105. Enterprise promotion program 105 receives multi-media contents from multi-media content monitoring administrator program 111, and, promotes the multi-media contents between web content management system 112, and digital asset management system 114.

Database storage device 106 is any type of storage device, storage server, storage area network, redundant array of independent discs (RAID), cloud storage service, or any type of data storage that stores monitored and detected administrative interactions, for defining a location to store, and retrieve the multi-media contents in web content management system 112. Database storage device 106 includes multi-media content files 117. Multi-media content files 117 stores created reusable image components of multi-media content monitoring administrator program 111, wherein, the stored reusable image components are retrieved for consolidation, or mapping, in one instance, the created reusable image components to multi-media contents, in a defined template location of web content management system 112.

Web content management system 112 is a mainframe server system, such as, a web management server, or any other electronic device, or web computing server system that manages multi-media contents of a website, or a set of related web pages, served from a single domain of web content management environment 100, in accordance with embodiments of the present invention. Web content management system 112 can also represent a "cloud" of computers interconnected by one or more networks, wherein web content management system 112 is a primary server for a web based computing system, utilizing clustered computers when accessed through network 102.

Web content management system 112 includes web content management application 109. Web content management application 109 provides administrative interface capabilities, for administrator 103 to manage web content, data or information of a website project, or internet or intranet applications of web content management application 109. Web content management application 109 also provides a web application interface, in multi-media content monitoring administrator program 111, for allowing administrator 103 to define at least one location in an automated content management template of web content management application 109, for storing the multi-media contents, in the defined location of web content management application 109.

Digital asset management system 114 is a web based server inventory management system that provides management tasks and, decisions including the ingestion, annotation, cataloguing, storage, retrieval, or distribution of multi-media contents files of web content management environment 100.

In this description, the terms "graphic", "image", "media", "display", "presentation" are all used interchangeably to refer to signal that is displayed across one or more multi-media contents of digital asset management system 114. The signal may encode a wide range of graphic data, including, for example, a range of graphical data that displayed in text, graphics, media sources, images, and video, or audio of the multi-media contents, in digital asset management system 114. For instance, digital photographs, animations, videos and music exemplify the target areas of media asset management of the multi-media contents that can be managed by digital asset management system 114. Digital asset management system 114 also provides a protocol for downloading, renaming, backing up, rating, grouping, archiving, optimizing, maintaining, thinning, and exporting the multi-media content files.

Digital asset management system 114 includes asset management program 115. Asset management program 115 provides a web based digital asset interface for managing the multi-media contents. Administrator 103 selects multi-media contents in asset management program 115, wherein, the selected multi-media contents are monitored by enterprise promotion program 105, for automatic transmittal of the multi-media contents to web content management application 109, for storing the multi-media contents in defined location of an authoring template of web content management application 109, in accordance with embodiments of the present invention.

Network 102 includes one or more networks of any kind that can provide communication links between various devices and computers connected together within web content management environment 100. Network 102 can also include connections, such as wired communication links, wireless communication links, or fiber optic cables. Network 102 can also be implemented as a number of different types of networks, including, for example, a local area network (LAN), wide area network (WAN) or a packet switched telephone network (PSTN), or some other networked system. For example, web content management environment 100 can utilize the Internet with network 102 representing a worldwide collection of networks. The term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the world wide Web (the web).

Figure 2:
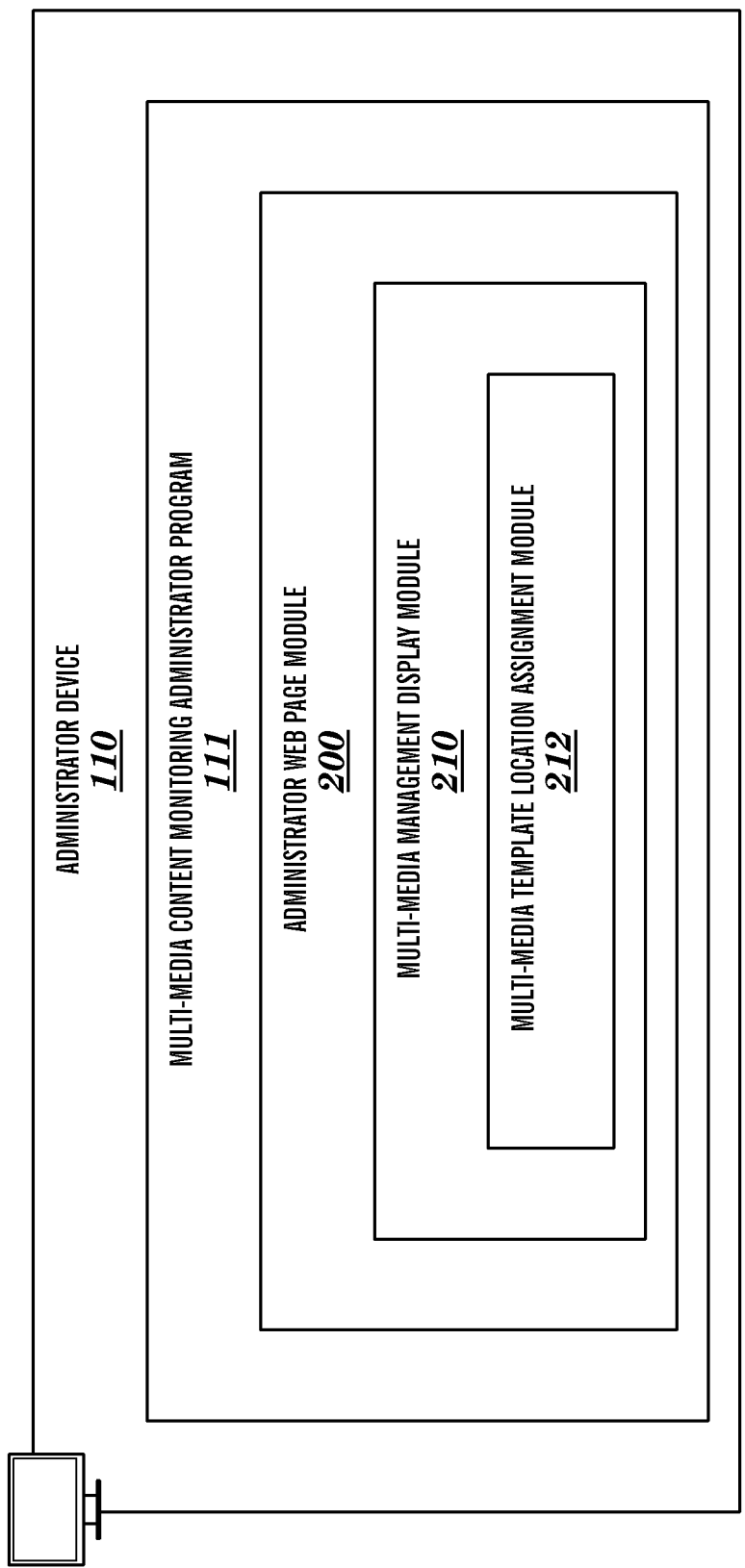
FIG. 2 is a functional block diagram illustrating program components of an administrator device in accordance with embodiments of the present invention.

FIG. 2 is a functional block diagram illustrating program components of administrator device 110, in accordance with embodiments of the present invention. Multi-media content monitoring administrator program 111, can, among other things, display multi-media contents accessible via network 102, such as web pages, or web server application systems.

Multi-media content monitoring administrator program 111 includes administrative web page module 200. Administrative web page module 200 is a web browser plug-in/add-on that extends the functionality of multi-media content monitoring administrator program 111 by adding additional user interface elements to multi-media content monitoring administrator program 111.

Administrative web page module 200 includes multi-media management display module 210, which is received in administrative web page module 300, from enterprise promotion program 104, for providing an interface, in multi-media template location assignment module 212, that allows administrator 103 to define at least one template location, in web content management application 109, for storing, and retrieving multi-media contents, or images of digital asset management program 116, in the defined at least one template location. Multi-media management display module 210 can also, include program code, such as, Hypertext Markup Language (HTML) code or JavaScript code that, when executed, adds one or more user interface elements to administrative web page module 200, for defining at least one location, within web content management application 109 for storing the multi-media contents.

Multi-media management display module 210 also provides an administrative interface that allows administrator 103 to create a library of reusable image components, in the defined template location, wherein the stored multi-media contents are consolidated with the stored multi-media contents in the defined template location of web content management application 109. For instance, in at least one embodiment, the library of reusable image components includes web content tables, web content lists, or web content text elements, including, image contents, or HTML elements, such as, images, tables, or plain text, or rich text elements, that are automatically generated, in the defined location, for storing, editing, or deploying the stored multi-media contents within web content management environment 100.

Figure 3:
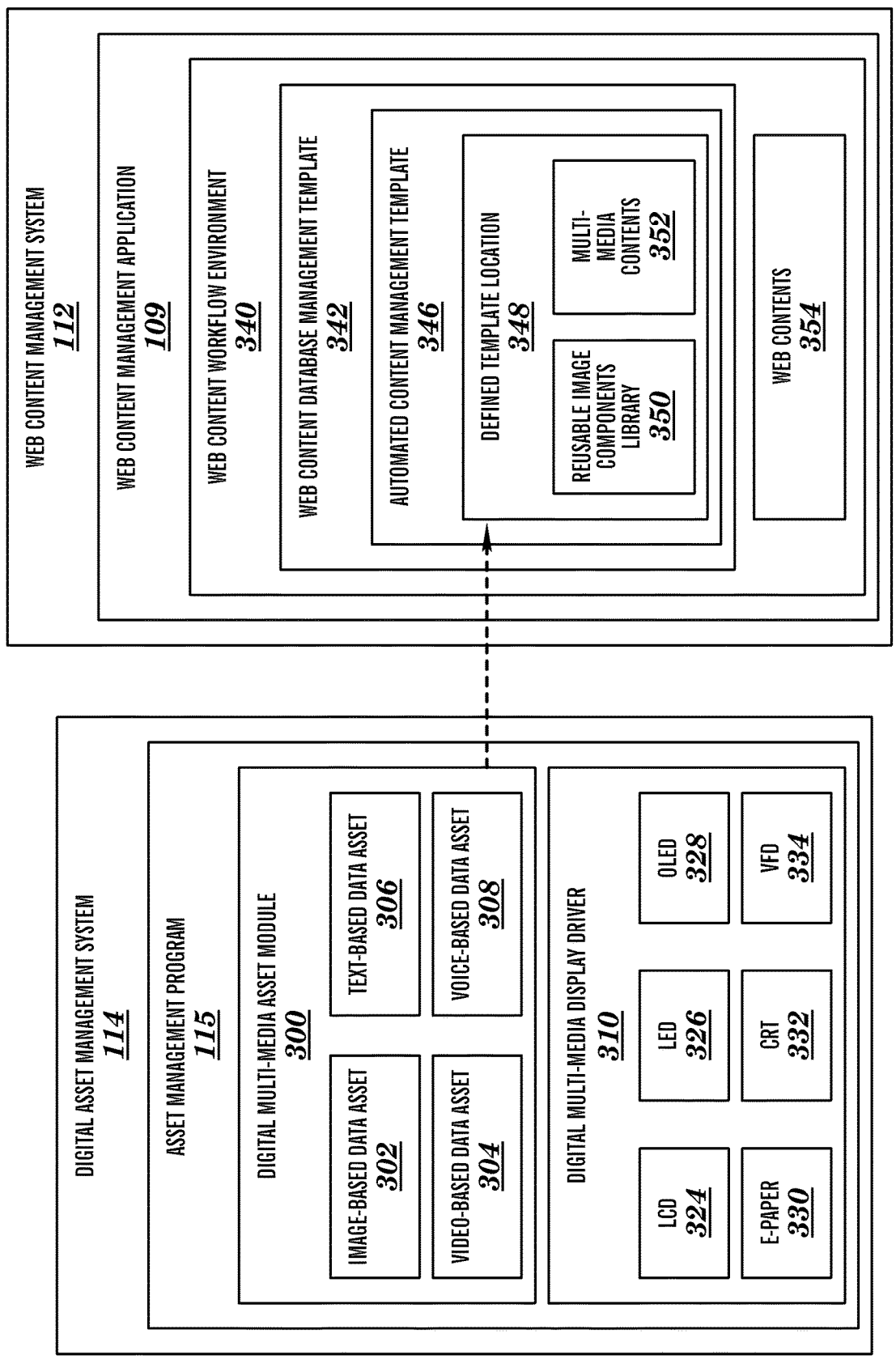
FIG. 3 is illustrates functional block diagrams of program components of a web content management system and a digital asset management system, in accordance with embodiments of the present invention.

FIG. 3 illustrates functional block diagrams of program components of web content management system 112 and digital asset management system 114, for selecting multi-media contents from digital asset management system 114, and, defining, at least one template location, in a web content template of web content management system 112, for storing the multi-media contents, and automatically consolidating the stored multi-media contents with a library of reusable image components, in accordance with embodiments of the present invention. In the illustrated embodiment, digital asset management system 114 includes asset management program 115. Asset management program 115 provides a web based digital asset interface for managing multi-media contents within web content management environment 100. Asset management program 115 can also include digital assets of the managed multi-media contents, including, for example, media objects, such as a picture, movie, song, data or the like. The digital assets may contain multiple versions of multi-media files, including a latest, or active version, and all previous versions of files of the multi-media contents.

According to at least one embodiment, the multi-media contents of asset management program 115, include, for instance, image-based data asset 302, text-based data asset 306, video-based data asset 304, and voice-based data asset 308, which, may be accessed via digital multi-media asset module 300, when/if selected, by administrator 103, or a system, in multi-Media client administrative web page module 300, for transmission and, storage of the selected multi-media contents in a defined location of an authoring template of web content management application 109. Asset management program 115 also includes digital multi-media asset module 300, which is received in asset management program 115, from enterprise promotion program 105, for providing a client interface for displaying the digital assets of the managed multi-media contents to administrator 103 via multi-media management display module 210.

Digital multi-media asset module 300 is communicatively coupled to digital multi-media display driver 310, for transmitting display of the media contents to multi-media management display module 210. For instance, digital multi-media display driver 310 provides a graphical interface function between a general-purpose peripheral interface of digital multi-media asset module 300, and display devices, e.g. liquid-crystal display (LCD) 324, light-emitting diode (LED) 326, OLED (organic light-emitting diode) 328, ePaper 330, cathode ray tube (CRT) 332, and vacuum fluorescent display (VFD) 334, for displaying, the multi media contents in multi-media management display module 210, in accordance with embodiments of the present invention.

Web content management system 112 operates web content management application 109. As described, web content management application 109 provides administrative interface capabilities, in web content workflow environment 340, for collaborative management, including, storage, editing, or monitoring of multi-media contents, media data, or other media related, or web based information of web content management application 109.

Web content management application 109 provides a web application interface of web contents 354, in multi-media content monitoring administrator program 111, that allows administrator 103 to define, in web content database management template 342, at least one defined template location 348, in automated content management template 346, for storing the multi-media contents 352, and reusable image components library 350, wherein, the stored multi-media contents 352 are consolidated with the reusable image components library 350 in defined template location 348, for storing, editing, or deploying the stored multi-media contents 352.

For instance, automated content management template 346 receives selected multi-media contents 352 from digital multi-media asset module 300, for storage of the selected multi-media contents 352 in defined template location 348. The selected multi-media contents 352 are transmitted to defined template location 348, together with the generated reusable image components library 350. Automated content management template 346 further determines if the selected multi-media contents were previously transmitted, stored and, is present in defined template location 348, wherein, the determination is based on search of component identifiers of reusable image components library 350. The component identifiers includes web content tables, web content lists, or web content text elements, that are complied for storing, editing, or deploying the multi-media contents 352, within web content management application 109, in accordance with embodiments of the present invention.

Enterprise promotion program 105, determines, via automated content management template 346, in defined template location 348, if the selected at least one multi-media content was already transmitted, stored and, is present in defined template location 348. For instance, according to at least one embodiment, if the selected at least one multi-media content is confirmed present in defined template location 348, automated content management template 346 automatically links, and consolidates the selected at least one multi-media content 352 with library of reusable image components library 350, wherein the linked, and consolidated reusable image components library 350 provides a platform for dynamic management of the multi-media contents 352 within web content management application 109.

Figure 4:
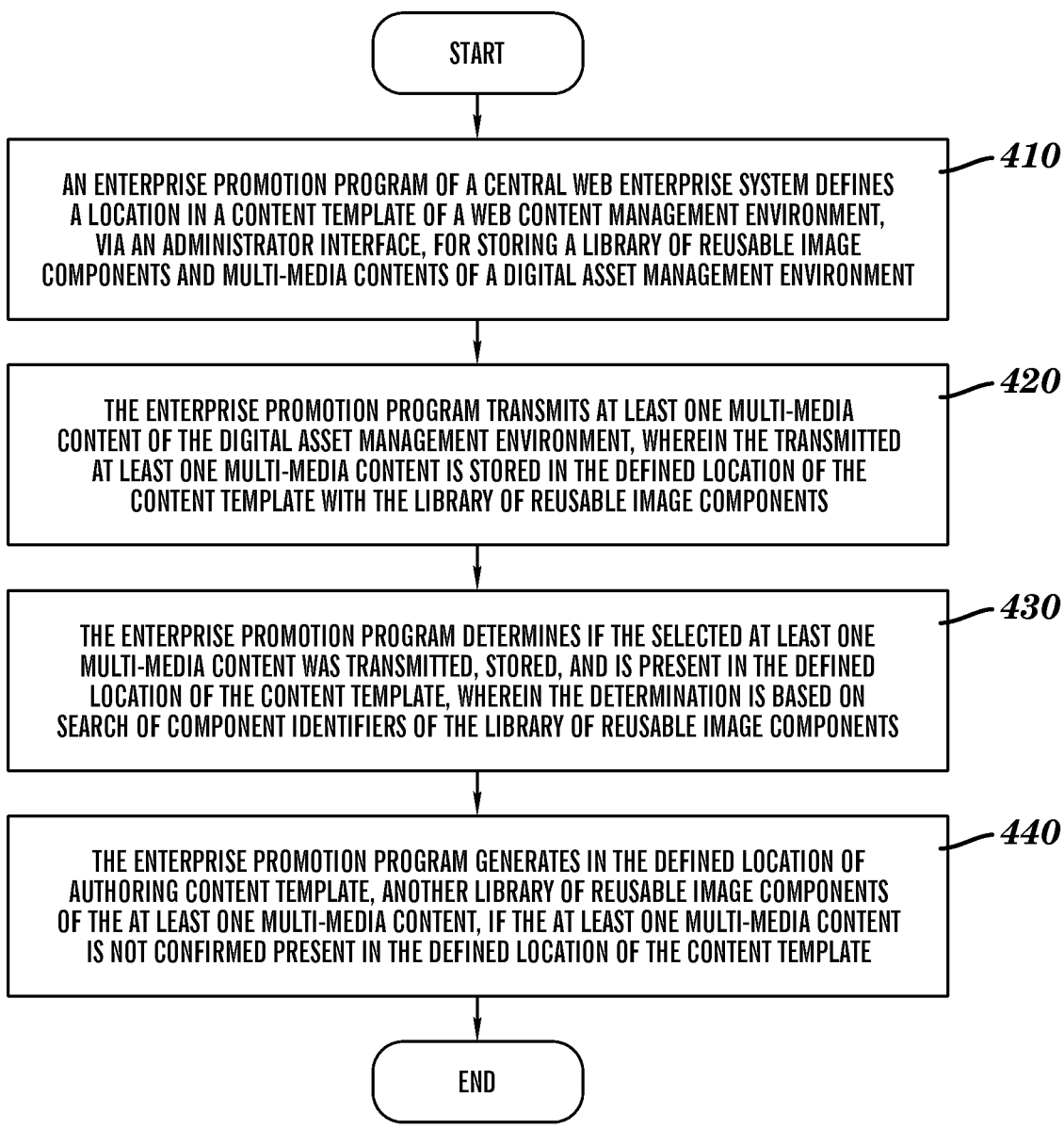
FIG. 4 is a flow diagram depicted steps performed by an enterprise promotion program for consolidating reusable image components library with multi-media contents, in accordance with embodiments of the present invention.

FIG. 4 is a flow diagram depicted steps performed by enterprise promotion program 105 for consolidating reusable image components with multi-media contents, in accordance with embodiments of the present invention.

Enterprise promotion program 105 defines a location in automated content management template 346 of web content management application 109, for storing reusable image components library 350, and multi-media contents 352 of asset management program 115, wherein the location is defined, by administrator 103, or a system, via multi-media management display module 210. (Step 410). Enterprise promotion program 105 also transmits multi-media contents 352, wherein the transmitted multi-media contents 352 is stored in defined template location 348, with reusable image components library 350. (Step 420). Enterprise promotion program 105 further determines if multi-media contents 352 were already transmitted, stored and, is present in defined template location 348. (Step 430).

Enterprise promotion program 104 generates in defined template location 348, another library of reusable image components library 350, if multi-media contents 352 is not confirmed present defined template location 348. (Step 440). Alternatively, as described, if the selected at least one multi-media content is confirmed present in defined template location 348, enterprise promotion program 105, automatically links, and consolidates, via automated content management template 346, the selected at least one multi-media content 352 with reusable image components library 350.

Figure 5:
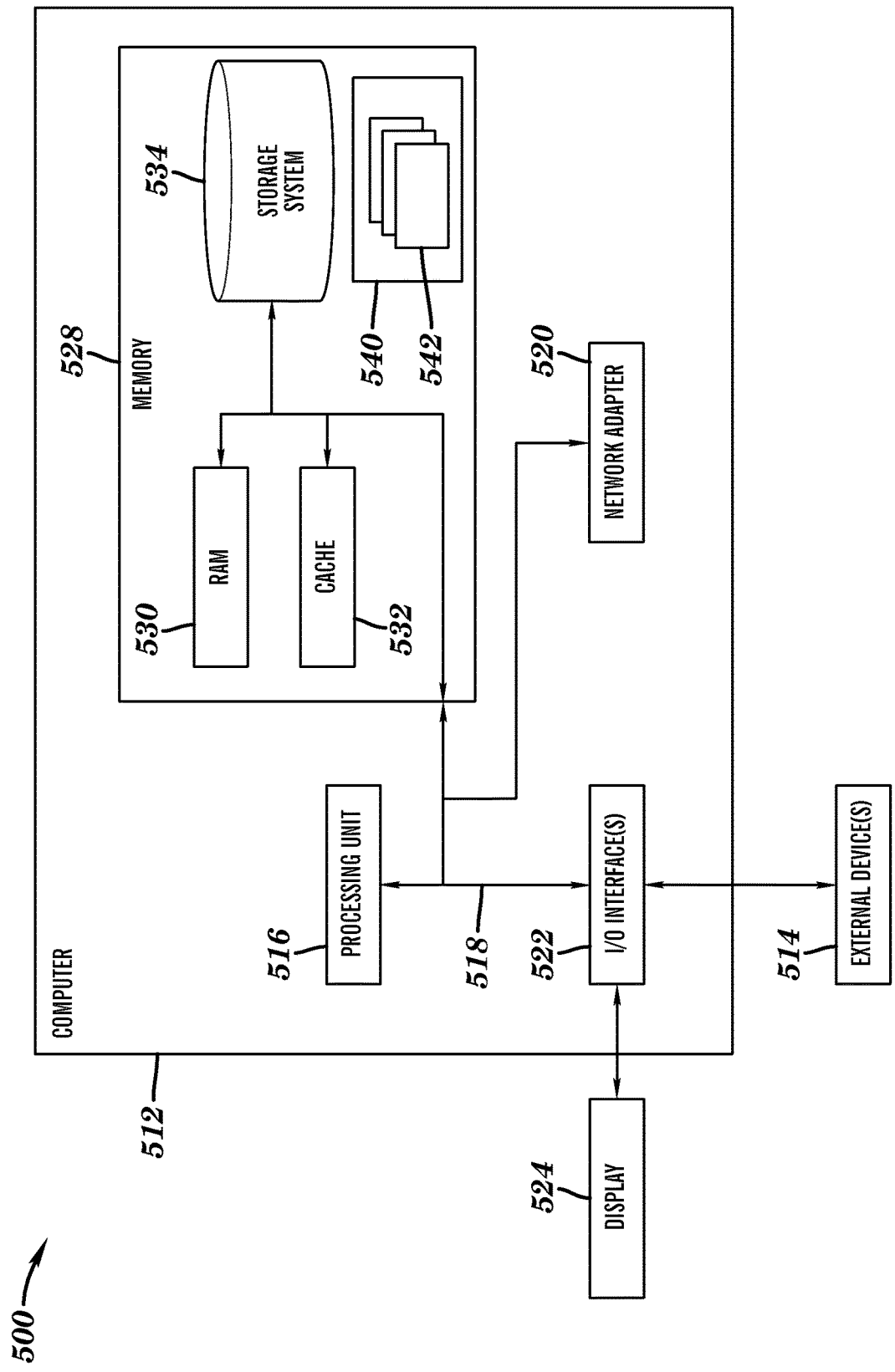
FIG. 5 illustrates a block diagram of components of a computer system, in accordance with embodiments of the present invention.

FIG. 5 is a functional block diagram of a computer system, in accordance with an embodiment of the present invention.

Computer system 500 is only one example of a suitable computer system and is not intended to suggest any limitation as to the scope of use or functionality of embodiments of the invention described herein. Computer system 500 is capable of being implemented and/or performing any of the functionality set forth hereinabove. In computer system 500 there is computer 512, which is operational with numerous other general purpose or special purpose computing system environments or configurations. Examples of well-known computing systems, environments, and/or configurations that may be suitable for use with computer 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of administrator device 110, web content management system 112, digital asset management system 114, and central web enterprise system 105 can include or can be implemented as an instance of computer 512.

Computer 512 may be described in the general context of computer system executable instructions, such as program modules, being executed by a computer system. Generally, program modules may include routines, programs, objects, components, logic, data structures, and so on that perform particular tasks or implement particular abstract data types. Computer 512 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 5, computer 512 is shown in the form of a general-purpose computing device. The components of computer 512 may include, but are not limited to, one or more processors or processing units 516, memory 528, I/O interface 522, and bus 518 that couples various system components including memory 528 to processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 512 typically includes a variety of computer system readable media. Such media may be any available media that is accessible by computer 512, and includes both volatile and non-volatile media, and removable and non-removable media.

Memory 528 includes computer system readable media in the form of volatile memory, such as random access memory (RAM) 530 and/or cache 532. Computer 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Multi-media content monitoring administrator program 111, asset management program 115, web content management program 109 and enterprise promotion program 105 can be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Each one of Multi-media content monitoring administrator program 111, asset management program 115, web content management program 109, and enterprise promotion program 105 are implemented as or are an instance of program 540.

Computer 512 may also communicate with one or more external devices 514 such as a keyboard, a pointing device, etc., as well as display 524; one or more devices that enable a user to interact with computer 512; and/or any devices (e.g., network card, modem, etc.) that enable computer 512 to communicate with one or more other computing devices. Such communication occurs via Input/Output (I/O) interfaces 522. Still yet, computer 512 communicates with one or more networks such as a local area network (LAN), a general wide area network (WAN), and/or a public network (e.g., the Internet) via network adapter 520. As depicted, network adapter 520 communicates with the other components of computer 512 via bus 518. It should be understood that although not shown, other hardware and/or software components could be used in conjunction with computer 512. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which include one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product for consolidating reusable image components with multi-media contents has been described. However, numerous modifications and substitutions can be made without deviating from the scope of the present invention. In this regard, each block in the flowcharts or block diagrams may represent a module, segment, or portion of code, which include one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A computer system for consolidating reusable image components with multi-media contents, between a digital asset management environment and a web content management environment, the computer system comprising:
one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
program instructions to define a location in a content template of a web content management environment for storing a library of reusable image components and multi-media contents of a digital asset management environment, wherein the multi-media contents comprise multiple versions of multi-media files comprising an active version and all previous versions of multi-media files of the multi-media contents, wherein the defined location is configured to consolidate the library of reusable image components with the multi-media contents, wherein the library of reusable image components includes component identifiers of the at least one multi-media content, and wherein the component identifiers include web content tables, web content lists, or web content text elements, that are compiled for storing, editing, or deploying multi-media contents of the at least one multi-media content in the web content management environment;
program instructions to receive at least one multi-media content for storage in the digital asset management environment;
program instructions to if the received at least one multi-media content is present in the defined location of the content template, wherein the determination is based on search of component identifiers of the library of reusable image components, the component identifiers include web content tables, web content lists, or web content text elements, that are compiled for storing, editing, or deploying the multi-media contents within digital asset management environment; and
program instructions to consolidate and link, by the one or more processors, the received at least one multi-media content with the determined present at least one multi-media content, wherein consolidating comprises mapping each link to a single instance of the at least one multi-media content, wherein the single instance of the at least one multimedia content is linked to an active version of the reusable image components associated with the at least one multi-media content, and wherein linking comprises retrieving the active version of the reusable image components linked to the at least one multi-media content from the library of reusable image components to the defined location, and wherein linking the active version of the reusable image components to the at least one multi-media content further comprises displaying the active version of the reusable image components through web content management environment, to a website.

2. The computer system of claim 1, wherein if the at least one multi-media content is confirmed present in the defined location of the content template, the at least one multi-media content is automatically linked, and consolidated with the library of reusable image components, wherein the linked and consolidated library of reusable image components provides a platform for dynamic management of the at least one multi-media contents in the web content management environment.

3. The computer system of claim 1 further comprises:
program instructions to select at least one multi-media content, wherein the at least one multi-media content includes a text based data content, a video based data content, and a voice based data content, including, at least one of graphical sources, media sources, or image sources that are published, edited, or modified in the web content management environment.

4. The computer system of claim 3, wherein the at least one multi-media content is selected in an administrative client interface via a digital asset management environment.

5. The computer system of claim 4 wherein the digital asset management environment provides a protocol for downloading, renaming, storing, rating, grouping, archiving, optimizing, or exporting the at least one multi-media contents to the administrative client interface.

6. The computer system of claim 1, wherein the library of reusable image component comprises image metadata, wherein the image metadata includes at least one of web image identification, web image hypertext markup language elements, or web text elements of the at least one multi-media content.

7. A computer program product for consolidating reusable image components with multi-media contents, between a digital asset management environment and a web content management environment, the computer program product comprises:
one or more computer-readable storage devices and program instructions stored on at least one of the one or more storage devices, the program instructions comprising:
program instructions to define a location in a content template of a web content management environment for storing a library of reusable image components and multi-media contents of a digital asset management environment, wherein the multi-media contents comprise multiple versions of multi-media files comprising an active version and all previous versions of multi-media files of the multi-media contents, wherein the defined location is configured to consolidate the library of reusable image components with the multi-media contents, wherein the library of reusable image components includes component identifiers of the at least one multi-media content, and wherein the component identifiers include web content tables, web content lists, or web content text elements, that are compiled for storing, editing, or deploying multi-media contents of the at least one multi-media content in the web content management environment;
program instructions to receive at least one multi-media content for storage in the digital asset management environment;
program instructions to if the received at least one multi-media content is present in the defined location of the content template, wherein the determination is based on search of component identifiers of the library of reusable image components, the component identifiers include web content tables, web content lists, or web content text elements, that are compiled for storing, editing, or deploying the multi-media contents within digital asset management environment; and
program instructions to consolidate and link, by the one or more processors, the received at least one multi-media content with the determined present at least one multi-media content, wherein consolidating comprises mapping each link to a single instance of the at least one multi-media content, wherein the single instance of the at least one multimedia content is linked to an active version of the reusable image components associated with the at least one multi-media content, and wherein linking comprises retrieving the active version of the reusable image components linked to the at least one multi-media content from the library of reusable image components to the defined location, and wherein linking the active version of the reusable image components to the at least one multi-media content further comprises displaying the active version of the reusable image components through web content management environment, to a website.

8. The computer program product of claim 7, wherein if the at least one multi-media content is confirmed present in the defined location of the content template, the at least one multi-media content is automatically linked, and consolidated with the library of reusable image components, wherein the linked and consolidated library of reusable image components provides a platform for dynamic management of the at least one multi-media contents in the web content management environment.

9. The computer program product of claim 7 further comprises:
program instructions to select at least one multi-media content, wherein the at least one multi-media content includes a text based data content, a video based data content, and a voice based data content, including, at least one of graphical sources, media sources, or image sources that are published, edited, or modified in the web content management environment.

10. The computer program product of claim 9, wherein the at least one multi-media content is selected in an administrative client interface via a digital asset management environment and, wherein, the digital asset management environment provides a protocol for downloading, renaming, storing, rating, grouping, archiving, optimizing, or exporting the at least one multi-media contents to the administrative client interface.

11. The computer program product of claim 10, wherein the library of reusable image component comprises image metadata, wherein the image metadata includes at least one of web image identification, web image hypertext markup language elements, or web text elements of the at least one multi-media content.

* * * * *